March 6, 1934.    L. IVERSEN    1,949,717
METHOD AND APPARATUS FOR SHEARING
Filed Aug. 15, 1932    4 Sheets-Sheet 1
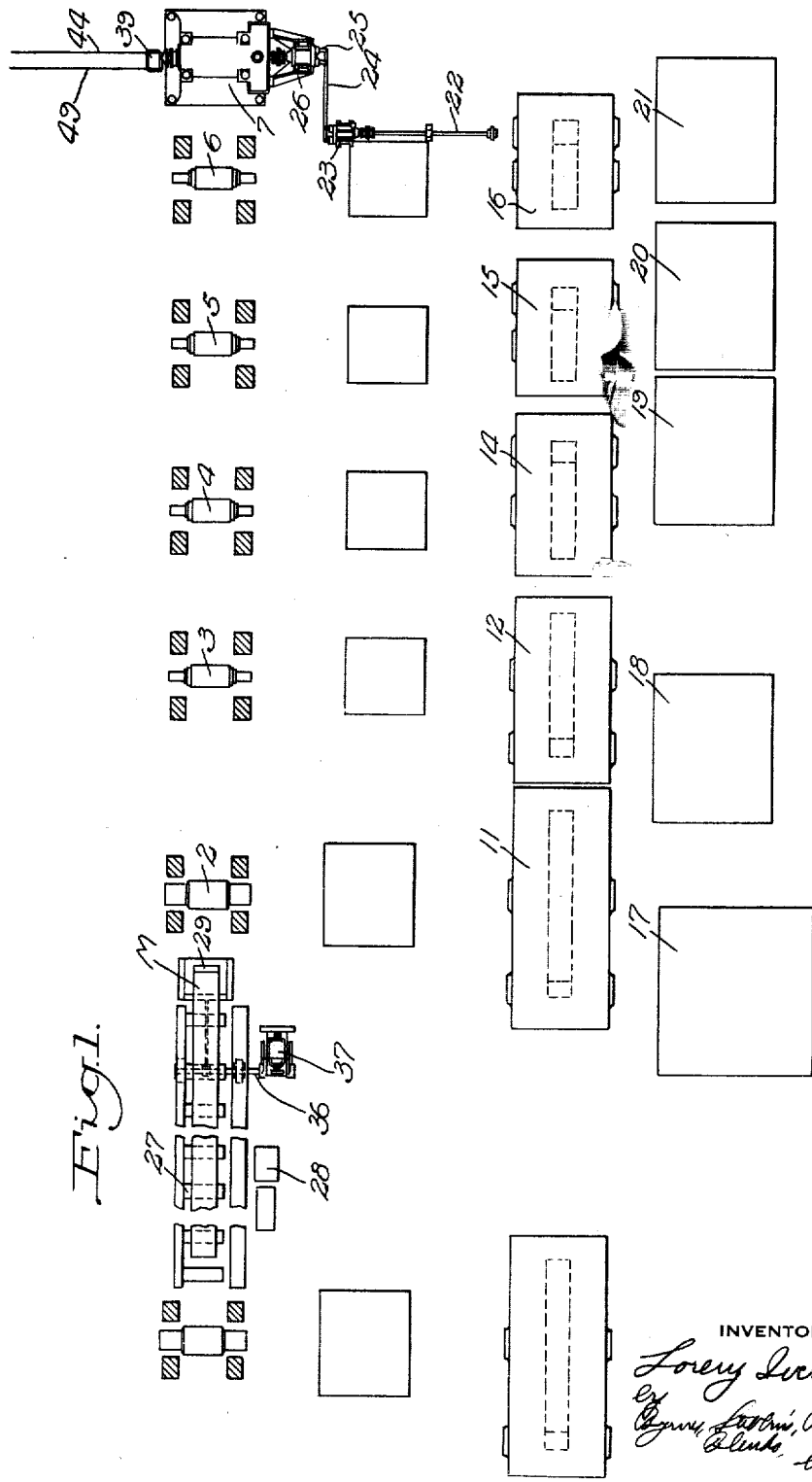
INVENTOR March 6, 1934.  L. IVERSEN  1,949,717
METHOD AND APPARATUS FOR SHEARING
Filed Aug. 15, 1932  4 Sheets-Sheet 2
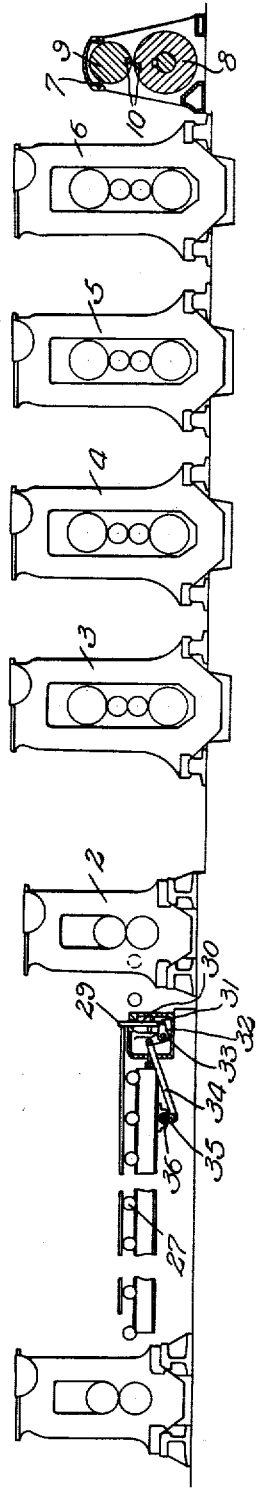
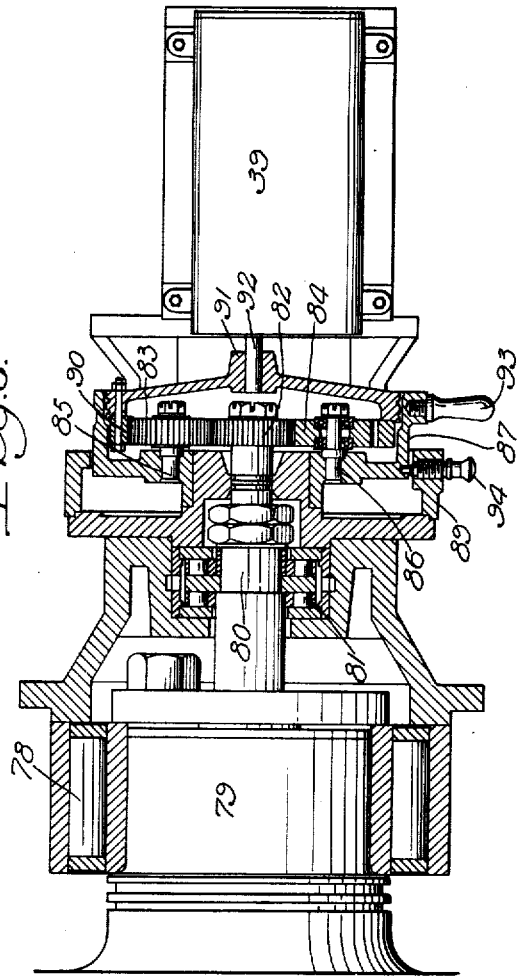
INVENTOR
Lorenz Iversen, March 6, 1934.  L. IVERSEN  1,949,717

METHOD AND APPARATUS FOR SHEARING

Filed Aug. 15, 1932  4 Sheets-Sheet 3

INVENTOR
Loren Iversen,

Fig. 6.

Patented Mar. 6, 1934

1,949,717

UNITED STATES PATENT OFFICE

1,949,717

METHOD AND APPARATUS FOR SHEARING

Lorenz Iversen, Pittsburgh, Pa., assignor to Mesta Machine Company, Pittsburgh, Pa., a corporation of Pennsylvania Application August 15, 1932, Serial No. 628,879

15 Claims. (Cl. 80—3)

The present invention relates broadly to the art of metal working, and more particularly to a method and apparatus for performing a shearing operation, generally referred to as cropping, on lengths of material as delivered by a rolling mill. More specifically, it pertains to the cropping by the use of a flying shear, conveniently of the rotary type, of material delivered from a continuous mill.

When utilizing shears of the rotary type, it is necessary in order to accurately crop the leading end of a piece of material, such as a strip or bar, to synchronize or time the arrival of the knives at a predetermined cutting position with the arrival of the leading end of the material at the shear. With such a synchronization the desired length of crop may be run through the shear before the instant the knives reach the cutting position.

In electrically operated shears driven independently of the mill stand delivering material to the shear, it is customary practice to effect the cropping of the leading end of the material by automatically initiating a shear operation by means of a flag switch or similar device which registers the time of arrival of the leading end of the material at some definite position ahead of the shear.

It is obvious that the accuracy of this method depends upon a constant or controlled period of acceleration, as well as accurate stopping of the shear after the desired cutting operations have been performed. If the stopping point varies in successive operations, the period of acceleration begins from various points and the length of crop varies. It is therefore necessary that the stopping point and the rate and period of acceleration be definitely controlled.

While installations of the character referred to have been more or less effectively utilized, such a method of starting and stopping the shear for each piece of material sheared, for the purpose of controlling the length of crop, is not readily applicable to a shear which is positively driven from the mill stand delivering to the shear. Such a positive uninterrupted drive from the mill stand is preferable on account of the greater accuracy as to the lengths cut. This makes it highly desirable to provide some means for accurate cropping with shears driven in this manner.

Ordinarily, shears of this type run continuously so long as the rolls of the mill stands are turning, and as the leading end of the strip arrives at the shear is set to cut. It will be apparent that such a random cutting, or a variable cropping is extremely undesirable, by reason of the waste incident to any cropped length greater than actually required.

The present invention has for one of its objects the provision of a method and apparatus for controlling the time of arrival of the leading end of the material at the shear, in such manner that the length of the leading crop can be readily controlled without changing the relation between the shear knives and the angular position of the rolls delivering to the shear. In other words, the present invention applies particularly to a flying shear positively driven in definite or predetermined speed relation with a mill stand effecting delivery thereto, without the necessity of starting and stopping the shear or varying the above mentioned speed relation.

In the accompanying drawings, I have shown more or less diagrammatically, for purposes of illustration only, one embodiment of the present invention. In the drawings—

Figure 1 is a diagrammatic top plan view or lay-out of an installation in accordance with my invention, certain of the parts being shown in section;

Figure 2 is a diagrammatic side elevation, partly in section, of the apparatus illustrated in Figure 1;

Figure 3 is a detail sectional view of the limit switch shown in Figure 1;

Figure 6 is a wiring diagram for the various parts.

Figure 4:
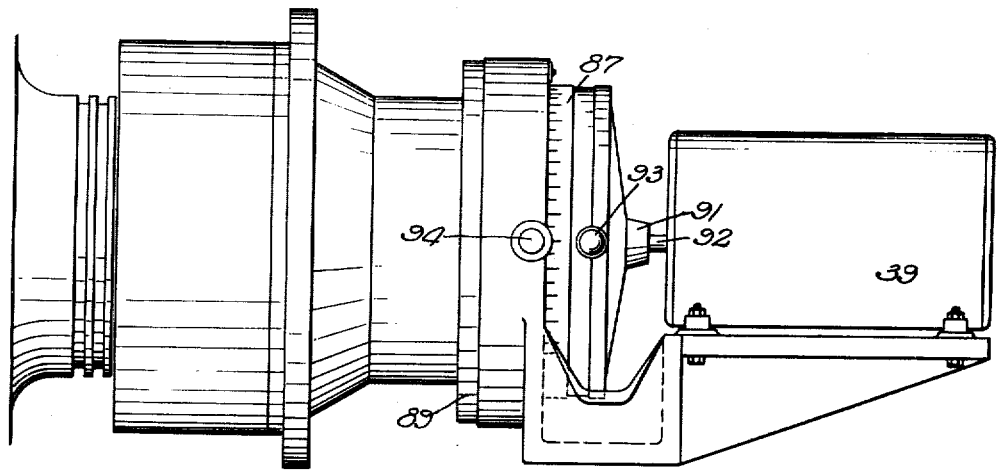
Figure 4 is a side elevational view of the limit switch of Figure 3.

Having reference more particularly to Figures 1 and 2 of the invention, there is shown a continuous mill comprising suitably arranged roll stands 2, 3, 4, 5 and 6. These mill stands may be of any of the types known in the art, arranged in tandem for delivering a continuous piece of material, such as a strip or bar M of considerable length to a flying shear 7.

The flying shear is herein illustrated as being of the rotary type comprising a lower rotor 8 and an upper rotor 9 each carrying shearing knives 10, the rotors being of the type that are intergeared in such manner that a shearing operation is effected once for each predetermined number of rotations of the rotors. With a 2 to 1 ratio for example, one shearing operation may be effected for each rotation of the rotor 8, during which time the rotor 9 has turned through two complete revolutions.

For driving the rolls of the stands 2 to 6 at suitable speeds, I have indicated gear reduction sets 11, 12, 14, 15 and 16. With these gear reduction sets, there are provided electric driving motors 17, 18, 19, 20 and 21 respectively, interconnected thereto in any desired manner, the gear reduction sets in turn being interconnected in any desired manner to the rolls of the mill stands which are to be driven.

The flying shear 7 is positively driven from the pinion shaft of the gear reduction set 16 through a shaft extension 22. This shaft is connected to a variable displacement hydraulic pump 23 for effecting rotation thereof in predetermined speed relationship to the operation of the gear reduction unit 16. The pump 19 is connected by suitable hydraulic piping 24 and 25 with a fixed displacement hydraulic motor 26. With such an installation it will be apparent that the flying shear is driven in predetermined speed relationship to the operation of the gear reduction unit 16, this relationship being variable at the will of the operator by varying the displacement of the variable displacement pump 23.

While such a hydraulic transmission is desirable in many cases due to its simplicity and effectiveness, it will be understood, however, that any good variable speed transmission may be substituted, the only requirement being that the shear be driven in a definite but adjustable and predetermined speed relation with the mill stand delivering to it. In fact, insofar as the fundamental principles of the present invention are concerned, the speed relationship might be constant and not adjustable, but in that case, only one definite length could be cut by the shear.

In advance of the mill stand 2 is a roller table 27 of sufficient length to accommodate a piece of material M, such as a slab, which will run out to the desired total length of strip, for example, if its thickness has been successively reduced in the stands 2 to 6 inclusive. This roller table is of the type adapted to be driven by a motor 28, preferably of the adjustable speed type, through a suitable arrangement of gears as well understood in the art.

By utilizing a motor of the adjustable speed type, the speed of the table can be properly matched with the desired entering speed of the slab into the mill stand 2. Intermediate the roll table and the entering mill stand is a stop 29 which normally projects above the delivery plane of the table 27, as indicated in Figure 2, in such position as to intercept a slab on the table and prevent the same from entering the stand 2. The stop is herein illustrated as comprising a vertically movable portion 30 having a suitable link connection 31 with one end of a bell crank lever 32 carried by a pivotal mounting 33.

The opposite end of the bell crank lever is connected by a link 34 to a lever 35 carried by a shaft 36. This shaft, as will be apparent from Figure 1 of the drawings, is adapted to be rotated by a motor 37 through a suitable drive. Operation of the motor 37 will be effective for rotating the shaft 36, and thereby withdrawing the stop from operative position to permit feeding movement of the slab, or moving it into operative position to effect stopping of a succeeding slab.

By properly correlating the time of withdrawal of the stop with the speed of acceleration of the roll table 27, assuming any predetermined distance between the stop and the entering mill stand 2, it will be apparent that the material will reach the rolls of the stand 2 at the proper speed for entering purposes. Preferably, the construction is such that the roll table 27 is started by the motor 28 in such a way as to accelerate the slab without slip between the same and the table rollers, the rate of acceleration being sufficient for the purposes indicated.

It is evident that for a given set-up of speed and draft relations throughout the train of mill stands, the elapsing time between the release of the stop and the arrival of the leading end of the strip in the flying shear will be constant for successive slabs if the speeds of the mill stands throughout are maintained constant, and the period of acceleration of the slab to the entry speed in stand 2 is constant within the limits of accuracy required.

In order to crop the same length from the leading end of successive strips, it is therefore necessary to time the release of the stop and the acceleration of the roller table with relation to the instantaneous position of the knives of the flying shear. This is accomplished, as herein shown, by means of a limit switch 39 of any conventional type driven from the shear 7.

Figure 6:
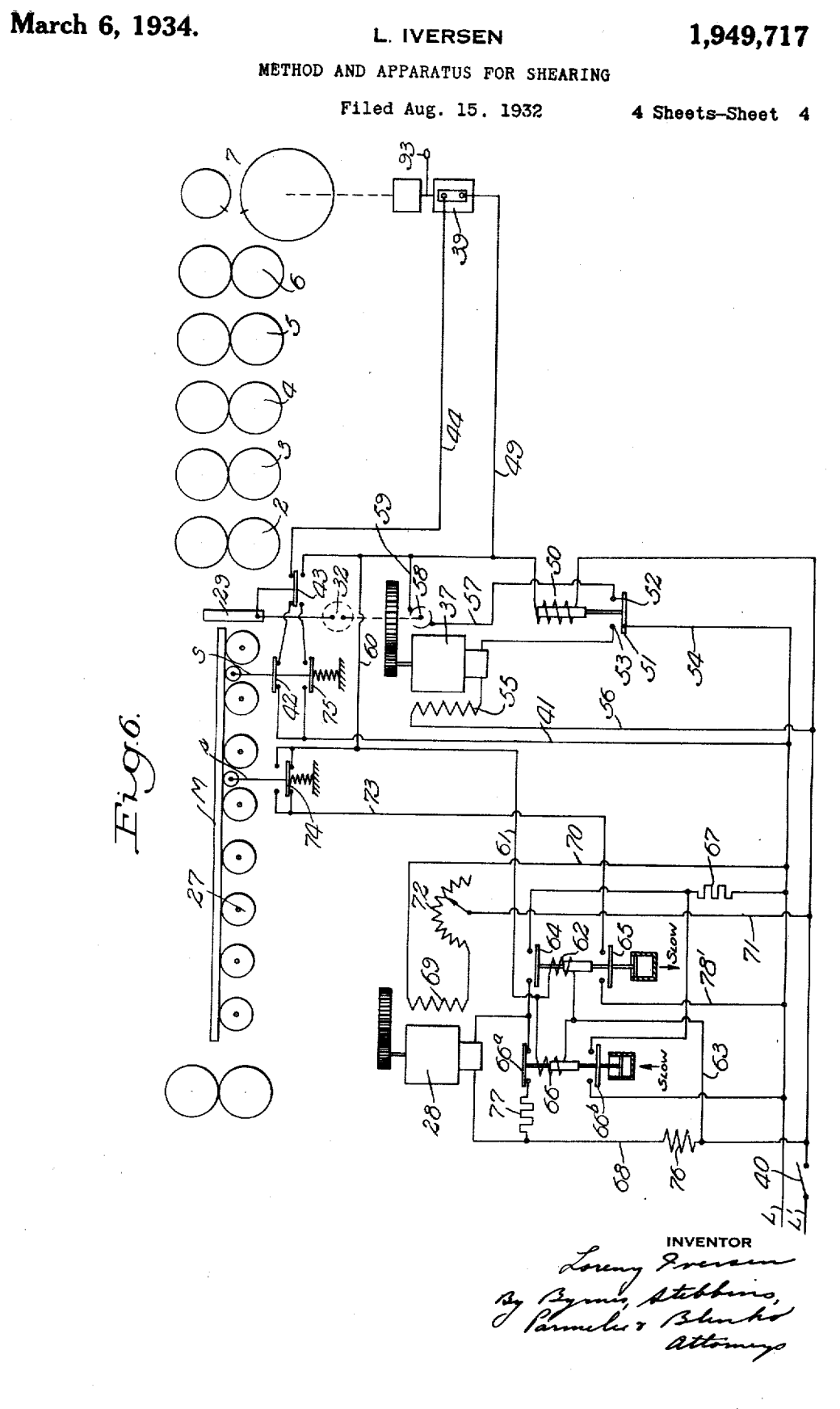

Arranged in the path of movement of the material on the roll table 27 is a flag switch S adapted to be depressed by the material against the opposition of a spring as indicated in Figure 6. Similarly, a second flag switch s is arranged to be depressed by material on the table against the action of its spring. In Figure 6 both of the flag switches are shown in depressed position. It is to be assumed that the shear 7 and the tandem mills 2 to 6, both inclusive, are running, but that the mill table 27 is standing still with the material M thereon and that the stop 29 is in its upper position in such manner as to prevent the passage of the material to the mills.

With the conditions assumed above, the operation of the system may be started by closing a master switch 40. The closing of this switch prepares a circuit for the energization of a contactor 50 but the circuit is not completed until the limit switch 39 closes. The circuit extends from one side of the supply source L', through the switch 40, the operating winding of the contactor 50, a conductor 49, the limit switch 39, a conductor 44, a limit switch 43 actuated by the stop 29, a contact 42 actuated by the flag switch S, and a conductor 41 to the other side of the supply circuit L. On the completion of this circuit by the closing of the limit switch 39, the energization of the coil of the contactor 50 causes it to close its contacts. The engagement of the contacts 51 and 53 of the contactor 50 completes a circuit for the armature of the motor 37 and its field winding 55. The motor starts to lower the stop 29. The engagement of the contacts 51 and 52 of the contactor 50 completes a sealing circuit for the coil of the contactor including a limit switch 58 driven by the motor 37 which is initially in open position but is moved to closed position as soon as the motor starts. The motor 37 continues to operate until the limit switch 58 again approaches the circuit-opening position. The contactor 50 is then de-energized and the motor 37 is stopped with the stop 29 in its lower position.

The closing of the limit switch 39 also completes a circuit for the contactors controlling the motor 28 which drives the table 27. The circuit extends from the supply conductor L by the conductor 41, contacts 42, 43, conductor 44, and the limit switch 39 to the conductor 49. The circuit then extends by a conductor 60 to a conductor 61 to the operating coils of contactors 62 and 66 connected in parallel, and thence by a conductor 63 to the supply conductor L'. The contactor 66 is slow to pick up and quick to drop out, while the contactor 62 is quick to pick up and slow to drop out. The completion of the circuit just described energizes the operating windings of the contactors 62 and 66. The initial movement of the contactor 66 opens a contact 66a. The contact 66b, however, is not closed until the contactor operation is completed and since the contactor is a slow operating device, this takes some time. The contactor 62 has a contact 64 which is closed almost instantaneously to connect the armature of the motor 28 across the supply circuit in series with a starting resistor 67 and the coil 76 of the electromagnetic brake of the motor 28. A contact 65 on the contactor 62 completes a locking circuit through a conductor 73 and a contact 74 on the flag switch s for the windings of the contactors 62 and 66.

The motor 28 has a shunt field winding permanently connected across the supply circuit and as soon as the contact 64 is closed, it starts to rotate to drive the table 27, the brake being released by the energization of coil 76. The contactor 66, when fully closed, shunts the starting resistor 67 by the contact 66b. The table 27 is soon accelerated to maximum speed and the material M is fed into the mill. It will be understood that the limit switch 39 is set so that the stop will be withdrawn and the table started at an instant with respect to the position of the shear blades such that the material will traverse the mill and reach the shear in time to have the desired length of crop end cut therefrom. The shear then continues to operate, to shear the material into lengths.

When the trailing end of the material passes off the flag switch s, the contact 74 thereof leaves its lower contacts and engages its upper contacts. The two sets of contacts are in parallel but the circuit is opened for a time sufficient to permit the contactor 62 to open its contact 65 which controls the sealing circuit for contactors 62 and 66. This would ordinarily decelerate and stop the motor 28, as will be later described, but the material M, having been entered into the mill, moves off the table 27 and releases the flag switch S by the passage of the trailing end of the material thereover. The flag switch S closes its lower contact 75 and, since the contact 43 of the stop 29 is in lower position, the original energizing circuit of the contactors 62 and 66 is immediately re-established through conductor 41 and contacts 75 and 43, as well as the circuit for the operating winding of the contactor 50. The contactors 62 and 66 are again operated to continue driving the table 27 at maximum speed. The operation of the contactor 50 closes its own locking circuit as before, through the limit switch 58 which, it is assumed, moves to contact-bridging position as soon as the motor 37 starts as a result of the energization of the contactor 50 to raise the stop 29 and open contact 43. When the stop is in proper position, the limit switch 58 opens and the contactor 50 is released to stop the motor 37.

The motor 28 continues to operate the table 27 as a result of the re-energization of contactors 62 and 66, as above described. The next piece of material is then fed to the table 27 and operates the flag switch s. The movement of the contact 74 again breaks the sealing circuit for the contactors 62 and 66 and the latter start to open. This time, the contact 43 is raised and the contact 42 is open so the original energizing circuit for contactors 62 and 66 is not re-established. The contact 66a of the contactor 66 is closed to establish the dynamic braking circuit through a resistor 77. Contact 66b opens and places resistance 67 in circuit, to impart a creeping speed to the motor 28. The contact 64 of the contactor 62 remains closed for a short time because of the slow release characteristics of the contactor, to maintain the creeping speed circuit for the motor 28. The latter is thus decelerated and driven at a very low speed to advance the second piece of material toward the stop 29. When the contactor 62 finally opens its contact 64, the motor 28 and table 27 will be practically stopped and the de-energization of the magnet coil 76 permits the application of the brake to stop the motor 28 fully. The flag switch s is positioned so that the deceleration and stopping of the motor 28 will take long enough to bring the piece against the stop 29. The final forward movement of the material on the table 27, however, operates the flag switch S to prepare the circuit for the reenergization of the contactor 50 to start the stop-operating motor 37, and of the contactors 62 and 66 to restart the table motor 28. If continued operation is desired, it will result automatically upon the next closing of the contact of the limit switch 39. If not, opening of the master switch 40 will prevent a repetition of the operating cycle. It will be apparent from the foregoing that the forward movement of each piece to the mill and the shear is started at an instant with respect to the position of the shear blades, such that the material will finally reach the shear in time to have the desired length cropped from the end thereof.

It has heretofore been pointed out that the leading end of the strip, for any given set-up, will always arrive at the shear within a definite time interval, from the time that the stop is moved to inoperative position. It becomes apparent, therefore, that if the stop is lowered when the knives of the shear are in a predetermined position, the leading end of the material will reach the shears and pass therethrough by the amount which it is desired to crop before the knives come into shearing position. This enables a definite and substantially constant length of crop to be cut from the leading end of each piece of material. While it is substantially constant for successive pieces of material, it may be varied from anything up to the maximum length for which the shear is set to cut, to any desired minimum, depending upon the position of the shear knives at the instant the circuit through the limit switch is closed.

Ordinarily for a new set-up, the length cropped will first be determined by trial. In order to vary the length of crop, in case the trial set-up is not as desired, it is only necessary to shift the angular position of the limit switch with relation to the instantaneous position of the rotating shear knives. This is preferably accomplished by means of a planetary drive between the shear and the limit switch, although any other suitable means may be utilized without departing from the spirit of my invention. It will be apparent, however, that a planetary drive enables the angular relationship between the shears and the limit switch to be adjusted while the shears are in operation, so that the length of crop may be correspondingly varied without stopping the operation of the mill or of the shear.

Figure 5:
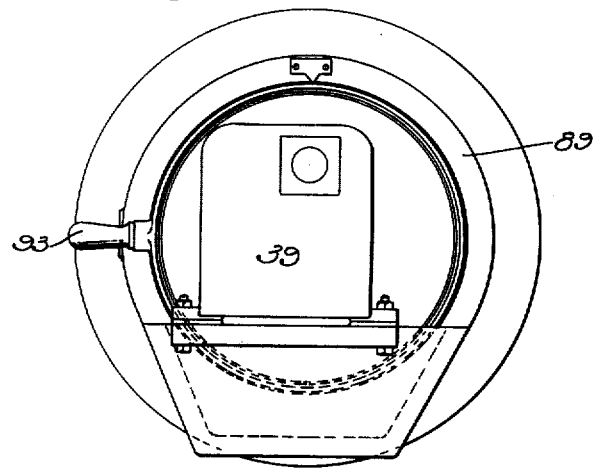
Figure 5 is an end elevational view of the parts shown in Figures 3 and 4.

The planetary drive which is preferably utilized in accordance with the present invention is illustrated in detail in Figures 3, 4 and 5, from which figures the operation of the limit switch will be more clearly apparent. In these figures there is illustrated a bearing 78 for the neck 79 of one of the shear rotors. This neck is provided with an extension shaft 80 and thrust bearing 81.

On the extension shaft is mounted a sun pinion 82 meshing with planet gears 83 and 84. These planet gears rotate on pins 85 and 86 fixed in a rotatable frame 87 mounted on a bracket 89 attached to the shear frame. The planet gears 83 and 84 in turn mesh with an internal gear 90 the hub 91 of which is keyed to the shaft 92 of the limit switch 39.

The rotatable frame 87 is provided with a handle 93 and a latch 94 arranged in such way that the frame, carrying the planetary gears, may be rotated to any desired angular position through the medium of the handle 93 and held in such angular position through the medium of the latch 94. When latched in any position, the gear ratio between the shear and the limit switch is such that the limit switch makes one complete revolution between successive cuts of the shear. If, however, the plantary frame 87 be rotated by means of the handle to any other angular position, the limit switch will be advanced or retarded relative to the position of the shear knives, so that the stop may be released at a correspondingly earlier or later period with respect to a given instantaneous shear knife position, as desired.

This angular movement of the planetary frame should be sufficient to shift the limit switch through 360°. In such case, the slab can be released for entry into the mill stand in any desired relation to any instantaneous position of the knives, thereby permitting any desired length of crop from minimum up to the maximum length for which the shears are set, to be cut. With the construction illustrated and described, the necessary adjustment to vary this length of crop may be made while the shear is running. This construction therefore possesses advantageous features in this respect.

The advantages of the present invention arise from the provision of an installation including a delivery table at the entering side of a mill, preferably of the continuous type, with a shear at the exit side. with connections whereby the shear is rotated in definite or controlled relationship to the mill stand which effects feeding movement to the shear, together with means whereby a feeding operation of the material to be rolled may be initiated in predetermined relationship to an instantaneous position of the shear.

Further advantages arise from the provision of means whereby the shear speed may be greater or less than the delivery speed of the mill, whereby an adjustment of the shear for cutting longer or shorter pieces, after the initial crop, may be effected.

Still further advantages result from the provision of a shear of such construction that it may be utilized as a drive for a limit switch controlling the entering material, and particularly where the limit switch in adjustable with respect to the shear so that the initiation of the feeding movement may be varied, i. e., advanced or retarded, relative to a predetermined instantaneous position of the shear knives.

While I have herein illustrated and described a preferred embodiment of my invention, it will be understood that changes in the construction and operation of the parts, as well as in the manner of driving the same, may be made without departing either from the spirit of my invention or the scope of my broader claims.

I claim:

1. In the method of rolling and cropping material, the steps comprising driving a flying shear in predetermined relationship to the delivery speed of a mill, stopping the material to be rolled at the entrance to the mill, and initiating the feeding movement of material to the mill in predetermined relationship to the instantaneous position of the shear knives.

2. In the method of rolling and cutting material, the steps comprising driving a flying shear in predetermined relationship to the delivery speed of one stand of a continuous mill, stopping the material to be rolled before it enters the mill, and initiating the feeding movement of the material to be rolled and sheared to a stand of said mill in timed relation to the instantaneous position of the knives of such flying shear.

3. In an apparatus of the character described, feeding means for material to be sheared, a mill for receiving material from said feeding means, a shear, means for driving the mill and shear in predetermined relationship, said shear including cutting knives, a stop intermediate the feeding means and the mill, and means for releasing the stop in predetermined relationship to an instantaneous position of said knives.

4. In an apparatus of the character described, feeding means for material to be sheared, a mill for receiving material from said feeding means, a shear, means for driving the mill and shear in predetermined relationship, said shear including cutting knives, a stop intermediate the feeding means and the mill, and means for releasing the stop and initiating operation of the feeding means in predetermined relationship to an instantaneous position of said knives.

5. The combination with a mill including a plurality of stands, of a stop in advance of one of the stands, a shear receiving material from one of the stands, a motor for effecting movement of said stop, a timing switch driven by said shear, and a circuit between said switch and said motor for releasing said stop in predetermined timed relation to the instantaneous cutting position of the shear.

6. The combination with a mill including a plurality of stands, of a stop in advance of one of the stands, a shear receiving material from one of the stands, a motor for effecting movement of said stop, a timing switch driven by said shear, a circuit between said switch and said motor for releasing said stop in predetermined timed relation to the instantaneous cutting position of the shear, and means for varying the instantaneous relationship.

7. The combination with a flying shear, of a switch driven from the shear, means for advancing or retarding the switch relative to the shear while the shear is running, means controlled by said switch for initiating the delivery of material to the shear, and a mill through which said material passes on its way to the shear after being released by said switch, there being means for driving the shear in timed relation to said mill.

8. In an apparatus of the character described, feeding means for material to be sheared, a mill for receiving material from said feeding means, a shear, means for driving the mill and shear in predetermined adjustable relationship, said shear including cutting knives, a stop intermediate the feeding means and the mill, means for releasing the stop in predetermined adjustable relationship to an instantaneous position of said knives, and means for adjusting the relationship between operation of the stop releasing means and the instantaneous position of the shear knives.

9. In an apparatus of the character described, feeding means for material to be sheared, a mill for receiving material from said feeding means, a shear, means for driving the mill and shear in predetermined adjustable relationship, said shear including cutting knives, a stop intermediate the feeding means and the mill, means for releasing the stop and initiating operation of the feeding means in predetermined adjustable relationship to an instantaneous position of said knives, and means for adjusting the relationship between operation of the stop releasing means and the instantaneous position of the shear knives.

10. Metal working apparatus comprising a shear, a rolling mill, and means for advancing material to the mill and the shear, a stop between the material advancing means and the mill, and means actuated by the advancing material for controlling the stop.

11. The combination with a rolling mill, a shear for cutting material emerging therefrom, and means for delivering material to the mill, of a stop between the mill and the delivery means, and means actuated by the material for controlling the delivery means and said stop.

12. The combination with a rolling mill, a shear for cutting material emerging therefrom, and a roll table for delivering material to the mill, of a stop between the table and mill, means actuated by the shear for withdrawing the stop, and means operated by movement of the material off the table for resetting the stop.

13. The combination with a rolling mill, a shear for cutting the material emerging therefrom, and a roll table for delivering material to the mill, of a stop between the table and the mill, means actuated by movement of the shear for withdrawing the stop, means operated by movement of the material off the table for resetting the stop, and means actuated by advancing material for stopping the table as the material approaches the stop.

14. The combination with a rolling mill, a shear for cutting material emerging therefrom, and a table for delivering material to the mill, of a stop between the table and mill, means for withdrawing said stop, and means actuated by material on the table and by the operation of the shear for jointly controlling the stop withdrawing means.

15. The combination with a flying shear, of a switch driven by said shear, means for advancing or retarding the switch relative to the shear while the shear is running, including a planetary gear drive between the switch and shear having a normally stationary but manually adjustable member, and means controlled by said switch for initiating the delivery of material to the shear.

LORENZ IVERSEN.

---

CERTIFICATE OF CORRECTION.

Patent No. 1,949,717.   March 6, 1934.

LORENZ IVERSEN.

It is hereby certified that error appears in the printed specification of the above numbered patent requiring correction as follows: Page 1, line 53, commencing with the words "is set to cut." strike out all to and including the word "required" in line 60 and insert instead in a random relation to the arrival of the knives at their cutting position, any length may be cropped up to the maximum length which the shear is set to cut. It will be apparent that such a random cutting, or a variable cropping is extremely undesirable, by reason of the waste incident to any cropped length greater than actually repuired; page 4, line 73, for "in" before "adjustable" read is; and that the said Letters Patent should be read with these corrections therein that the same may conform to the record of the case in the Patent Office.

Signed and sealed this 19th day of June, A. D. 1934.

Bryan M. Battey (Seal)   Acting Commissioner of Patents.

feeding means for material to be sheared, a mill for receiving material from said feeding means, a shear, means for driving the mill and shear in predetermined adjustable relationship, said shear including cutting knives, a stop intermediate the feeding means and the mill, means for releasing the stop in predetermined adjustable relationship to an instantaneous position of said knives, and means for adjusting the relationship between operation of the stop releasing means and the instantaneous position of the shear knives.

9. In an apparatus of the character described, feeding means for material to be sheared, a mill for receiving material from said feeding means, a shear, means for driving the mill and shear in predetermined adjustable relationship, said shear including cutting knives, a stop intermediate the feeding means and the mill, means for releasing the stop and initiating operation of the feeding means in predetermined adjustable relationship to an instantaneous position of said knives, and means for adjusting the relationship between operation of the stop releasing means and the instantaneous position of the shear knives.

10. Metal working apparatus comprising a shear, a rolling mill, and means for advancing material to the mill and the shear, a stop between the material advancing means and the mill, and means actuated by the advancing material for controlling the stop.

11. The combination with a rolling mill, a shear for cutting material emerging therefrom, and means for delivering material to the mill, of a stop between the mill and the delivery means, and means actuated by the material for controlling the delivery means and said stop.

12. The combination with a rolling mill, a shear for cutting material emerging therefrom, and a roll table for delivering material to the mill, of a stop between the table and mill, means actuated by the shear for withdrawing the stop, and means operated by movement of the material off the table for resetting the stop.

13. The combination with a rolling mill, a shear for cutting the material emerging therefrom, and a roll table for delivering material to the mill, of a stop between the table and the mill, means actuated by movement of the shear for withdrawing the stop, means operated by movement of the material off the table for resetting the stop, and means actuated by advancing material for stopping the table as the material approaches the stop.

14. The combination with a rolling mill, a shear for cutting material emerging therefrom, and a table for delivering material to the mill, of a stop between the table and mill, means for withdrawing said stop, and means actuated by material on the table and by the operation of the shear for jointly controlling the stop withdrawing means.

15. The combination with a flying shear, of a switch driven by said shear, means for advancing or retarding the switch relative to the shear while the shear is running, including a planetary gear drive between the switch and shear having a normally stationary but manually adjustable member, and means controlled by said switch for initiating the delivery of material to the shear.

LORENZ IVERSEN.

---

CERTIFICATE OF CORRECTION.

Patent No. 1,949,717.   March 6, 1934.

LORENZ IVERSEN.

It is hereby certified that error appears in the printed specification of the above numbered patent requiring correction as follows: Page 1, line 53, commencing with the words "is set to cut." strike out all to and including the word "required" in line 60 and insert instead in a random relation to the arrival of the knives at their cutting position, any length may be cropped up to the maximum length which the shear is set to cut. It will be apparent that such a random cutting, or a variable cropping is extremely undesirable, by reason of the waste incident to any cropped length greater than actually repuired; page 4, line 73, for "in" before "adjustable" read is; and that the said Letters Patent should be read with these corrections therein that the same may conform to the record of the case in the Patent Office.

Signed and sealed this 19th day of June, A. D. 1934.

Bryan M. Battey (Seal)   Acting Commissioner of Patents.